United States Patent [19]

Casey et al.

[11] Patent Number: 4,749,863
[45] Date of Patent: Jun. 7, 1988

[54] TWO-DIMENSIONAL PHOTON COUNTING POSITION ENCODER SYSTEM AND PROCESS

[75] Inventors: Michael E. Casey; Ronald Nutt; Terry D. Douglass, all of Knoxville, Tenn.

[73] Assignee: Computer Technology and Imaging, Inc., Knoxville, Tenn.

[21] Appl. No.: 796,073

[22] Filed: Nov. 7, 1985

Related U.S. Application Data

[63] Continuation-in-part of Ser. No. 677,931, Dec. 4, 1984.
[51] Int. Cl.⁴ .............................................. G01T 1/20
[52] U.S. Cl. ................... 250/363 S; 250/368; 250/505.1
[58] Field of Search .............. 250/363 S, 363 SB, 367, 250/368, 505.1

[56] References Cited

U.S. PATENT DOCUMENTS

| | | | |
|---|---|---|---|
| 3,859,531 | 1/1975 | Van Dijk | 250/368 |
| 3,970,853 | 7/1976 | Kuhl et al. | 250/363 SB |
| 4,394,576 | 7/1983 | Tanaka et al. | 250/366 |
| 4,531,058 | 7/1985 | Burnham et al. | 250/363 S |
| 4,563,582 | 1/1986 | Mullani | 250/363 S |
| 4,642,464 | 2/1987 | Mullani | 250/366 |

Primary Examiner—Janice A. Howell
Attorney, Agent, or Firm—Pitts and Brittian

[57] ABSTRACT

A two-dimensional photon position encoder system (10) and process which includes a detector (20) for enhancing the spatial resolution of the situs of the origin of incident photons of gamma rays. A plurality of scintillator material members (22) interact with the incident photons and produce a quantifiable number of photons which exit the scintillation material members. A tuned light guide (68) having a plurality of radiation barriers (92) of predetermined lengths define slots which are operatively associated with one of the scintillator material members. These slots (90) serve to enhance the predictability of the statistical distribution of photons along the length of the slotted light guide (68). A detector (20) detects the distribution of the photons at preselected locations along the length of the slotted light guide. In one embodiment, this detector (20) comprises a photomultiplier (70) which gathers information concerning the photoelectrons which are then counted. The statistical distribution of these photoelectrons is processed by an improved pattern recognition technique such that the positioning information can be determined.

10 Claims, 11 Drawing Sheets

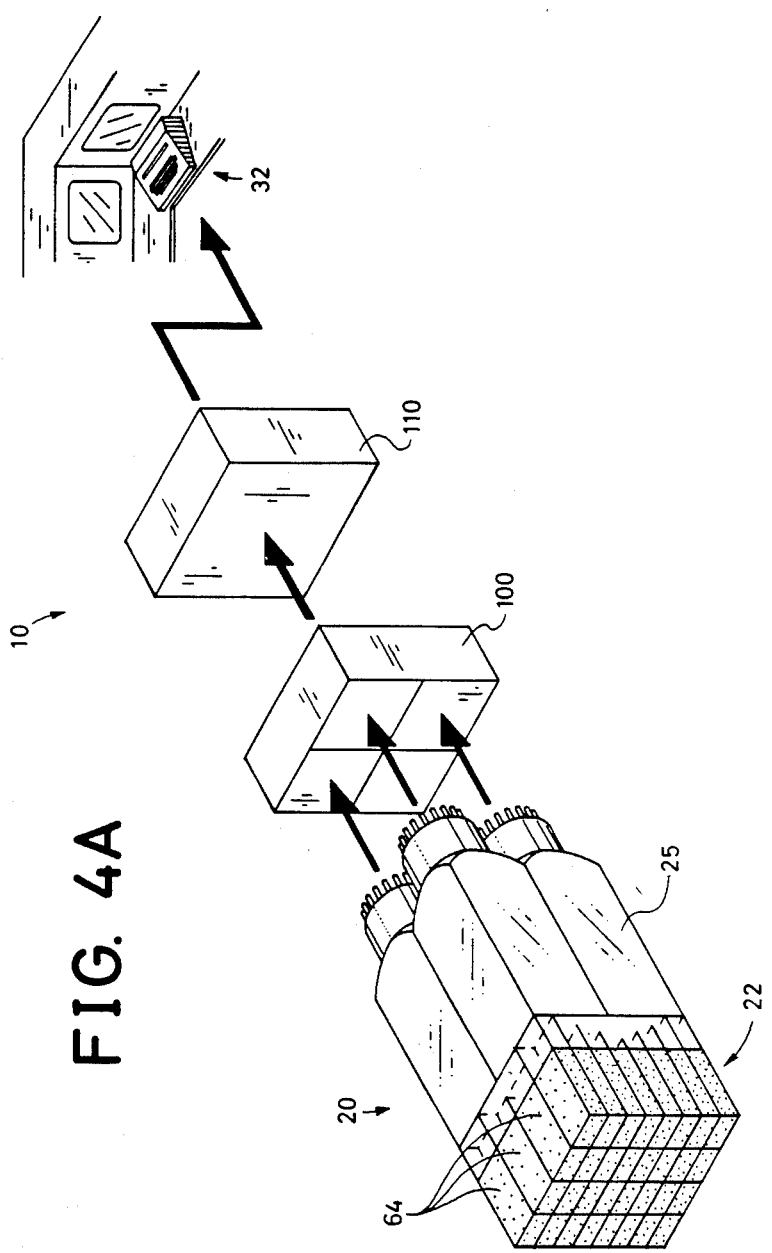

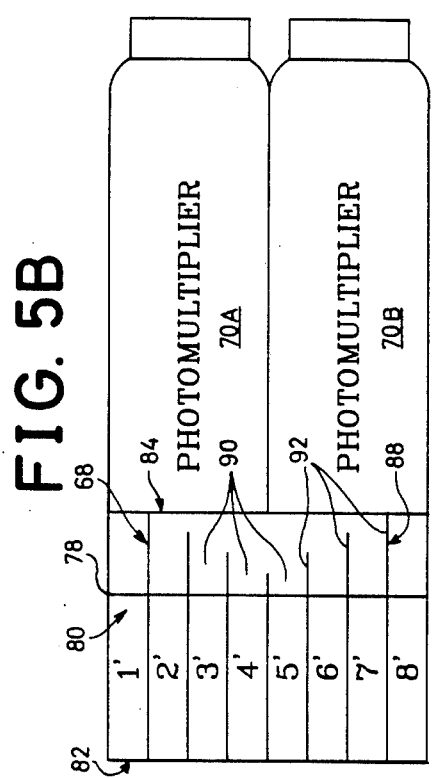
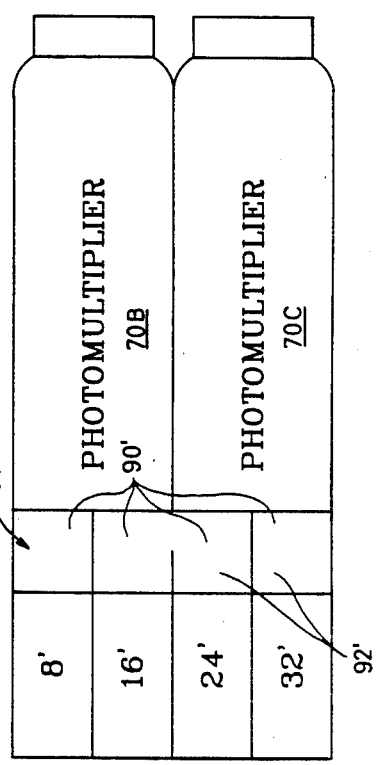
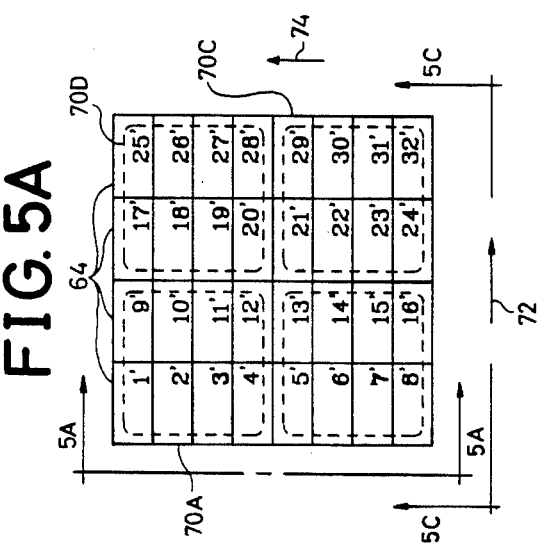

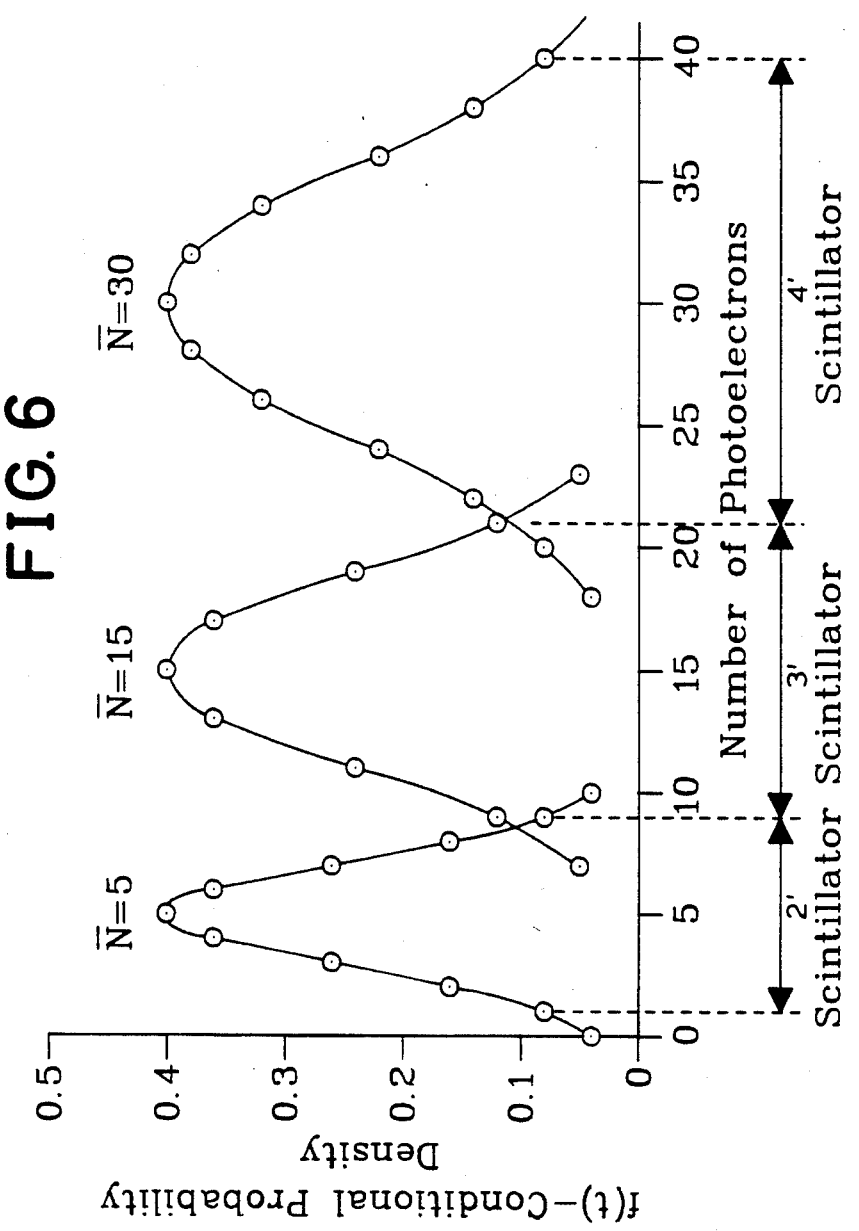

TWO-DIMENSIONAL PHOTON COUNTING POSITION ENCODER SYSTEM AND PROCESS

DESCRIPTION

This invention is a Continuation-In-Part of U.S. patent application Ser. No. 677,931, filed Dec. 4, 1984.

TECHNICAL FIELD

This invention generally relates to a position encoder and is more specifically directed to a two dimensional photon counting position encoder system and process having significantly improved spatial resolution characteristics. The features of the present invention find particular application in an improved positron emission tomography system for sensing and quantitatively measuring biochemical and/or physiological changes in the body or other living organism, however, the use is not limited to such application.

BACKGROUND ART

Positron emission tomography (PET) is a type of nuclear imaging that is used in a number of applications, especially medical diagnostic and research imaging. In a typical state-of-the-art positron emission tomography system, one type of radioactive compound, such as a fluorodeoxyglueose (FDG) which is a radiopharmaceutical, is administered to a patient or other living organism under surveillance. Positrons, which are positively charged particles, are emitted by the isotopes of the radioactive compound as the isotopes decay within the body. Upon emission, the positron encounters an electron, and both are annihilated. As a result of one annihilation, gamma rays are generated in the form of two photons. It was discovered approximately thirty years ago that these two photons are emitted in approximate opposite directions (about 180 degrees) from one another. The precise position of the positron-emitting isotope can be determined by surveying these photons. Traditionally, PET scanners accumulate information concerning the lines of travel of the emitted photons at different angles around the body under surveillance, and process this information through a computer to generate a tomographic image of the distribution and concentration of the isotope. In this connection, the PET scanner can observe and quantify biochemical and physiological changes that occur naturally and in disorders in the human body.

Traditionally, positron emission tomography systems employ discrete scintillators, usually bismuth germanate crystals arranged in rings. Typically there are approximately one hundred or more detectors per ring, with up to five rings in the detector structure. A coincidence event is an event in which gamma rays are given off across the axis of the subject, defined as a line along which the positron annihilation must have occurred. Spatial resolution in current PET scanning systems is limited by the detector resolution capability. In addition, current PET scanning equipment is complex and very expensive to manufacture and to maintain. Further, state-of-the-art position encoders employ analog techniques to detect and analyze the photon emissions. Such analog techniques are unstable and can vary with the detector gains used in analyzing the signals.

Accordingly, it is an object of the present invention to provide a two dimensional photon counting position encoder system and process having improved spatial resolution characteristics.

Another object of the present invention is to provide such a system and process which are significantly less expensive to manufacture and maintain.

It is yet another object of the present invention to provide a photon detector which includes a slotted or tuned light guide to facilitate the encoding process.

Still a further object of the present invention is to employ a technique and means for counting the photons rather than using less stable analog position processing techniques during the accumulation of information for generation of the tomographic image. Further, pattern recognition techniques are used in one embodiment to decode detector gathered information.

DISCLOSURE OF THE INVENTION

Other objects and advantages of the present invention will become more apparent upon reviewing the detailed description and associated drawings of the two dimensional photon counting position encoder system and process. A scintillation detector is provided which includes a plurality of scintillator material members such as crystals which interact with incident radiation to produce a quantifiable number of photons. A tuned slotted light guide is operatively associated with the crystals and defines a preselected number of slots. At least one slot is associated with at each crystal. Photons exit the crystal subsequent to scintillation and enter the slotted light guide wherein the photons are distributed with controlled predictability along the length of the guide. Means are provided for detecting the photons at preselected locations along the length of the light guide. In one embodiment, photomultipliers are provided to count the photoelectrons. Pattern recognition techniques can be used to determine the situs of the photon emitted as a result of the annihilation of the positron, i.e., the situs of the positron emitting isotope. The process and system embodying various features of the present invention can be utilized in several applications, such as in PET Scanning Systems.

BRIEF DESCRIPTION OF THE DRAWINGS

The above-mentioned features of the invention will become more clearly understood from consideration of the following description when read together with the accompanying drawings, in which:

FIG. 4A is a perspective view of a scintillator detector which includes a slotted light guide operatively associated with the crystals as illustrated.

FIGS. 5A, 5B, and 5C depict front, side and bottom views, respectively, of the detector illustrated in FIG. 4.

FIG. 6 illustrates a graph of the probability density of photons (photoelectrons) occuring at preselected crystal/scintillator locations.

BEST MODE FOR CARRYING OUT THE INVENTION

Figure 1:
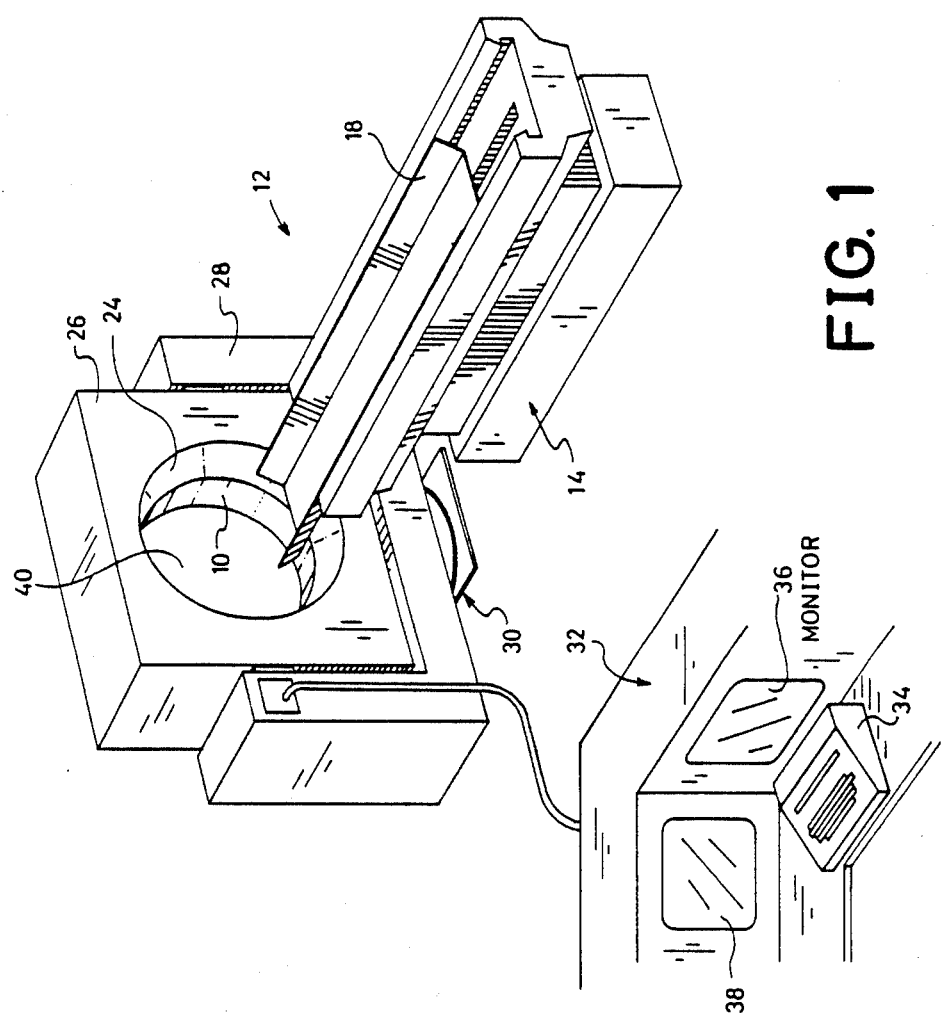
FIG. 1 is a perspective view of a positron emission tomography scanner embodying a two dimensional photon counting position encoder system incorporating certain features of the invention.

A two dimensional photon position encoder system is generally indicated at 10 in FIG. 1. In this figure, the system 10 incorporates various features of the invention and is applied in a positron emission tomography (PET) scanner 12 commonly used in the medical diagnostic imaging and research imaging applications. More specifically, this scanner 12, which is a substantially conventional design except for its utilization of the photon position encoder system 10 of the present invention, includes a patient bed 14 which supports a patient 16 (see FIG. 2) during medical diagnostic imaging operations. The illustrated patient bed 14 includes a sliding carriage 18 which is selectively operated to move the patient 16 into position (see FIG. 2) for the diagnostic operations of the scanner. In such position, a selected portion of the patient's body being diagnosed is positioned in a plane defined by the scintillation material members 22 of the encoder system 10, as will be described more generally hereinafter.

The photon position encoder system 10 as shown in FIG. 1 is mounted in a ring 24, which will be described in greater detail below. This ring is carried by gantry 26 of conventional design. The gantry is rotatably mounted about a horizontal axis by the U-shaped mounting bracket 28. This mounting bracket 28 can be rotated about a vertical axis by rotational means 30 which supports the gantry 26.

A computer console generally indicated at 32 is electrically connected to the scanner 12 and serves to control the movement and electronic controls normally associated with a scanner 12 such as the drives for rotating the gantry 26 about a horizontal and/or vertical axis. This computer 32 includes a keyboard 34 and a monitor 36 of conventional design. Further, a tomography monitor 38 enables an operator sitting at computer console 32 to view a body-section tomography produced by the scanner 12.

In order to produce a body-section tomographic image of a selected portion of a patient's body 16, the patient is moved into the patient opening 40. A radioactive isotope, such as a radiopharmaceutical, is normally administered to the patient prior to movement into the patient opening 40. During the time the radioactive isotope is within the body, positrons are emitted. These positrons each combine with an electron and are annihilated. Gamma rays in the form of two photons are given off in opposite directions from the situs of the annihilation. These photons travel in opposite directions or a direction separated by 180 degrees. Detection of the presence, direction of travel, and distribution of the photons, provides information necessary to generate a tomographic image of a body-section or section of another living organism positioned within the scanner.

Figure 2:
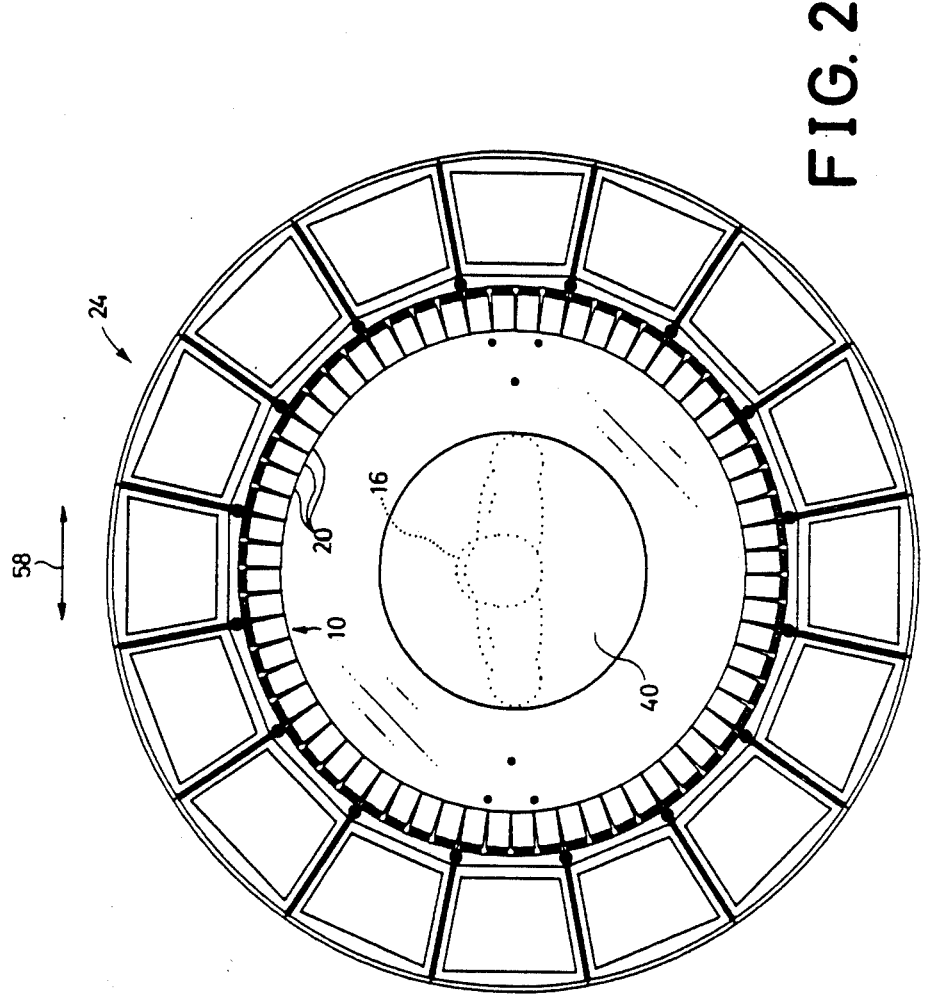
FIG. 2 is an end view of the ring of the scanner portion of the system illustrated in FIG. 1 and depicts the positioning of the scintillation detectors.
Figure 3:
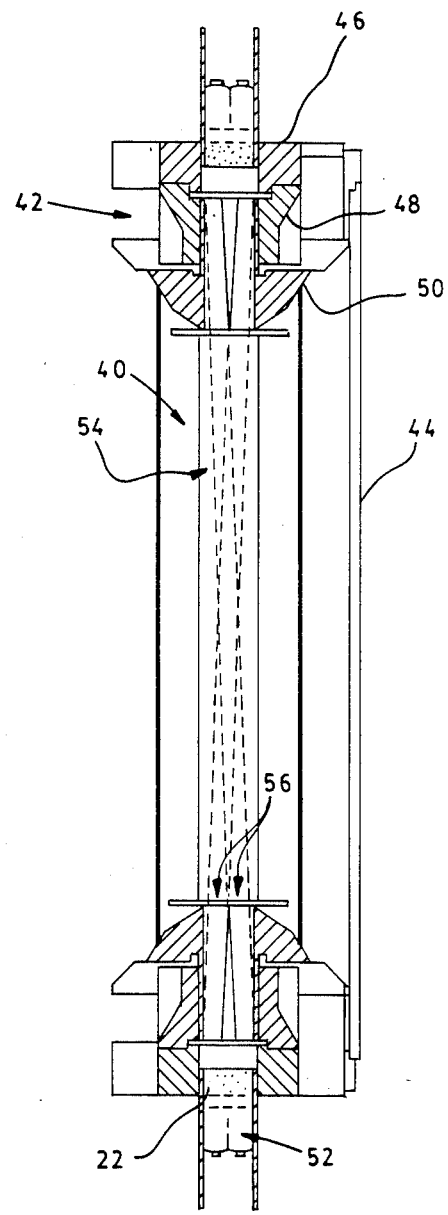
FIG. 3 illustrates a sectional elevation view of the ring portion of the scanner illustrated in FIG. 1.

In the ring 24 illustrated in FIGS. 1, 2, and 3, detectors are positioned in a plane(s) and completely surround the body of a patient. This ring is. illustrated diagrammatically in FIG. 2. A cross-sectional view of the detectors' support ring of conventional design is illustrated in FIG. 3. In this figure, the ring support hardware is generally indicated at 42. This hardware includes a frame 44 which supports the shields 46 and 48 and the adjustable axial shielding 50. The detector array generally indicated at 52, circumscribes the patient opening 40 and interacts with the photons traveling along the dotted paths generally indicated at 54. These photons pass through the openings 56 and interact with the scintillator material members 22 to enable the photon position encoder system to commence the accumulation of information necessary to determine the distribution and the spatial resolution of the photons and the situs of their origin.

Thus, a typical application of an improved two dimensional photon position encoder system 10 has been described and illustrated in FIGS. 1, 2 and 3, in which an otherwise conventional positron emission tomography scanner 12 is described. Inasmuch as the scanner 12 is conventional, the details of the operation of the scanner, the rotational movement of the gantry, and other features are not described in detail here, but are readily available in state-of-the-art information. A scanner such as the scanner 12 employing a two dimensional photon position encoder system 10 will have certain improvements over state-of-the-art systems. Accordingly, the improved position encoder system 10 will now be described in connection with the drawings.

A two dimensional photon position encoder system constructed in accordance with various features of the invention is illustrated generally at 10 in FIG. 4. This encoder system 10 is particularly suitable for use in connection with positron emission tomography (PET) as used in medical applications and described generally above. However, it should be readily understood that the system's use and the process employed by the system are not limited to positron emission tomography applications. For example, the system is suitable for use in connection with single photon gamma image systems, nuclear research "crystal ball" experiments, medical imaging, and materials analysis. Other applications may become readily apparent to those skilled in the art.

The two dimensional photon position encoder system 10 includes a detector 20 having improved spatial resolution characteristics. More specifically, the detector 20 includes a plurality of scintillator material members 22 which are mounted at preselected locations in a matrix configuration as shown in FIG. 4. A plurality of detectors can be arranged in an array, circumscribing the living organism, such as the human body 16 under surveillance as shown in FIG. 2, however, the positioning of the detectors 20 can vary with the specific application as will be pointed out in greater detail in connection with the configuration illustrated in FIG. 8. In the embodiment depicted in FIG. 4, the detector 20 includes a plurality of scintillator material members 22 comprising a plurality of bismuth germanate crystals 64 arranged in a matrix configuration. The illustrated crystal matrix is a 4×8 array.

More specifically, the detector 20 includes a plurality of bismuth germanate (BGO) crystals which are labeled in FIG. 5A sequentially from number 1' through 32'.

These crystals are substantially rectangular in cross-sectional outlines and are mounted on the light guide 68, which is viewed by the photomultiplier 25. It has heretofor been a practice to mount several BGO crystals on a single photomultiplier where the position is encoded by photodiodes mounted on the individual crystals. The major disadvantage of this prior art system is a need for cooling the photodiode, a requirement which decreases the system's commercial feasibility. Further, it has heretofor been a practice to employ light division from multiple scintillators to be used to position the scintillator. In this design, four scintillators are viewed by each photomultiplier. Because of the use of unslotted light guides in known prior art, the position resolution will be worse for some scintillators than others. In other words, the position resolution is not optimized in the continuous ring light division detector, which is employed in the prior art.

The analog difference signals from adjacent photomultipliers has been heretofore used to determine the precise location of the scintillators that detect a gamma ray event. A major disadvantage of this design is the cost and complexity of manufacturing such a detector. Use of the analog signal introduces instability in determining the scintillator position. Analog processing results in drifts due to high voltage changes in the photomultiplier and in the inherent instability of the photomultiplier gain. Further, there is a major difficulty in mounting several hundred crystals on continuous light guide while maintaining a high degree of uniformity in the detector spacing.

The crystals 64 are secured to the light guide 68 in a conventional manner, as with brackets, adhesive, or the like. Normally, the entire detector 20 is coated with a reflective paint such as Barium Sulfate reflector paint subsequent to completion of its construction to assist in preventing interference by spurious light sources. It will, of course, be recognized that the size and type of the crystals can vary with particular application. For example, Barium fluoride can be used as a crystal. In the illustrated embodiment depicted in FIG. 5A, the overall dimension of the detector face through which the photons enter the detector is 50.8 cm by 50.8 cm, and the length of each individual crystal is 25 cm. It will, of course, be recognized that this is simply an example dimension and other dimensions can be used as necessary or desired.

Figures 4B, 4C:
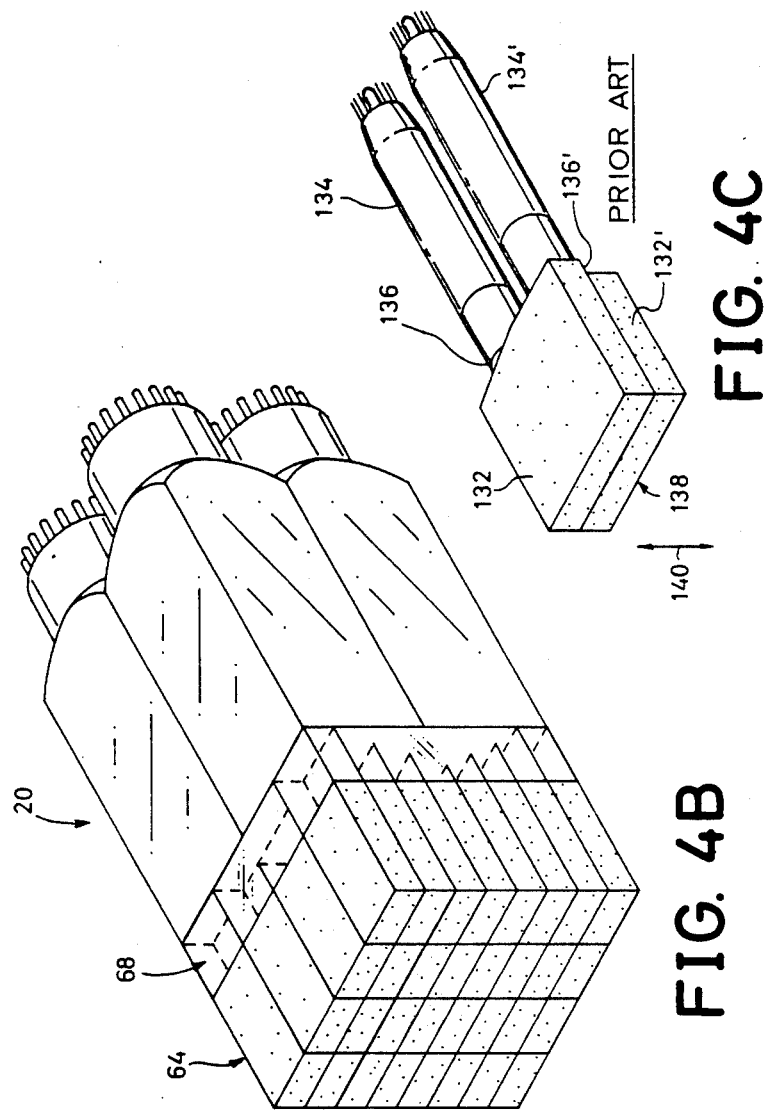
FIGS. 4B and 4C are perspective views of a detector embodying various features of the present invention and a prior art detector. A comparison of these detectors together with a reading of the detailed specification delineates the improved spatial resolution features of the detector of the present invention.

By constructing the detector as illustrated in FIGS. 4A and 4B, the number of photomultipliers used in viewing the light guide can be reduced by a factor of 8 over certain known prior art techniques. More specifically, as illustrated in FIGS. 4A through 4D and 5A through 5C, four photomultipliers, namely 70A through 70D can be used to view the light guide 68. The array of the crystals 64, which are individually numbered 1' through 32' is more clearly delineated in FIG. 5A. The arrow 72 depicts the axial direction, that is the longitudinal axis of the organism such as the body 16 under surveillance. Thus, there are four planes from which body-section tomographic images can be generated when a ring array of detectors is utilized as is the case in PET scanner application of the type illustrated in FIG. 1. The arrow 74 depicts a transaxial direction.

FIG. 5A depicts the arrangement of the photomultipliers 70A through 70D such that each photomultiplier is responsible for the information gathered by eight crystals. That is, photomultiplier 70A is operatively associated with crystals 1' through 4' and 9' through 12'. Photomultiplier 70B is operatively associated with crystals 5' through 8' and 13' through 16'. Photomultiplier 70C is operatively associated with crystals 21' through 24' and 29' through 32'. Photomultiplier 70D is operatively associated with crystals 17' through 20' and 25' through 28'.

It will be recognized that the detector depicted in FIGS. 4 and 5A through 5C is an exemplary detector. However, the crystal array can take various configurations. For example, a 5 ×7 array or other various sized arrays of crystals could be used. It is important, however, that the number of crystals exceeds the number of photomultipliers, which is a cost reducing feature. As will now be pointed out, this reduction in the number of photomultipliers does not deleteriously affect the quality of the data gathered.

As described generally above, the light pipe or guide 68 is operatively associated with back of the crystals 64. More specifically, light pipe 68 is fabricated from a solid transparent material, or in one embodiment, a matrix of solid transparent material sections, which transmit light from the face 78 of the light pipe 68 optically connected with the juxtaposed face defined by ends 80 of the crystals 22. Thus, light or photons enter the crystals 64 through the end surfaces 82 positioned closest the source of the photons. These photons produce photoelectrons within the crystals which exit the face 78 of the crystal array and enter the light pipe 68. The photons travel from face 78 of the light pipe 68 through the transparent material thereof to the opposite or remote face 84 of the light pipe where they are detected or viewed by the operatively associated photomultipliers.

The light guide 68 illustrated in FIGS. 5B and 5C, includes tuning means generally indicated at 88, which serves to control the distribution, more particularly, the statistical distribution, of the photons passing through the light pipe and thereby enhance the spatial resolution of the system, as will be pointed out in greater detail below. More specifically, the light pipe 68 is slotted with eight slots in one direction (the transaxial direction) as illustrated in FIG. 5B and four slots in the other direction (the axial direction) as illustrated in FIG. 5C, whereby each of the 32 crystals in the illustrated detector is operatively associated with one slot in the light guide. The slots 90 and 90' are defined by light/radiation (in this case photons) impervious panels or barriers 92 and 92' interposed at selected locations in the light guide. The depth of the slots are arranged such that the distribution of the photons detected by an adjacent photomultiplier are separated such that there is equal overlap as illustrated in FIG. 6. It will be noted that each slot registers with an operatively associated and optically connected crystal.

As an example, consider a typical case where seventy (70) photoelectrons are produced (energy resolution equals 28 percent FWHM) in any one of the crystals 64, when a photoelectric action occurs as a result of an incident 511 Kev gamma ray. If such an event occurs in crystal number 2', the slot is designed such that sixty-five (65) photoelectrons are generated in photomultiplier 70A on the average, and five (5) photoelectrons are generated in photomultiplier 70B (see FIG. 6) on the average. Correspondingly, if the event occurs in crystal number 3', the distribution would be fifteen (15) photoelectrons in photomultiplier 70B and fifty-five (55) photoelectrons in photomultiplier 70A. If the event occurs in crystal number 4', there will be thirty (30) photoelectrons in photomultiplier 70B and forty (40) photoelectrons in photomultiplier 70A. This distribution is shown to be optimal in FIG. 6, since it produces equal overlap of photoelectron distributions. Similarly, the tuning means 88' is provided for controlling the distribution of the photoelectrons in the axial direction, which is the second dimension, as shown in FIG. 5C. The transaxial tuning means 88' comprises four slots as shown in this FIG. 5C. The primed numbers in FIG. 5C illustrate the components of the detector similar to the like numbers in FIG. 5B but which are viewed in the transaxial direction.

The corner crystals 1', 8', 25', and 32' are uniquely identified by photoelectron counts, and only one operatively associated photomultiplier. For example, a scintillation event in crystal 1' will produce a signal only in photomultiplier 70A. Likewise, a scintillation event in crystal 8' will produce a signal only in photomultiplier 70B. An event in crystal 25' will produce a signal in photomultiplier 70D and an event in crystal 32' will produce a signal only in photomultiplier 70C. Crystals 2' and 7' will produce signals in photomultipliers 70A and 70B only. Crystals 26' through 31' will produce signals in photomultipliers 70D and 70C only.

It will be recognized that there are six (6) scintillators or crystals which provide the principle positioning information which must be processed in order to determine the location of the photon/gamma ray events in each plane represented by the crystal columns including crystals 9' and 17' in FIG. 5A. More specifically, in each plane represented by the crystal columns, including crystals 1', 3', 17', and 25', the crystals in which the scintillation occurred must be determined from the statistical distribution of the photons.

As shown in connection with FIG. 5B, and as mentioned above, the top and bottom crystals (1' and 8') in the column including crystal 1' are unique in that they are viewed by only one photomultiplier. Crystal 1' is viewed by photomultiplier 70A only, and crystal 8' is viewed by photomultiplier 70B only. Similarly, the remainder of the top crystals (3', 17', and 25') and the bottom crystals (16', 24', and 32') in the transaxial direction as seen in FIG. 5A, will be viewed by only one photomultiplier as illustrated in FIG. 5A. Thus, FIG. 5B is representative of each of the columns of crystals in each of the four (4) sectional planes being viewed by the detector to determine the positioning information necessary to produce a tomographic image.

The rows of crystals extending in the axial direction as depicted by arrow 72, include end crystals 1' through 8' and 25' through 32', which are uniquely viewed by a single photomultiplier. An example of this is shown in FIG. 5C which depicts the viewing in the transaxial direction of the crystal row including crystals 8', 16', 24', and 32'. It will be noted that crystals 8' and 32' are uniquely viewed only by photomultipliers 70B and 70C, respectively. Similarly, each of the ends of the rows of crystals as seen in the transaxial direction, namely rows 1' through 8' and 25' through 32', will be viewed by a single photomultiplier due to the illustrated barriers 92' as shown.

For purposes of clarity, the positioning information has been discussed in one dimension at a time, that is the transaxial direction in FIG. 5B and in the axial direction in FIG. 5C. Exemplary two dimensional positioning information is provided below in connection with TABLE A.

Referring again to FIG. 6, a typical representation of the statistical distribution of photons seen by an adjacent photomultiplier is depicted. For example, the minimum number of photoelectrons is seen by photomultiplier 8 (see FIG. 5B) as a result of a scintillation event in crystal 7'. In a typical example in which seventy (70) electrons are produced by a scintillation event, the photoelectrons are distributed between photomultipliers 70A and 70B in the transaxial direction. The adjacent photomultiplier will receive the fewest number of photoelectrons. In the example of an event in crystal 7', the light pipe 68 is designed with its tuning means for barriers 92 defining the slots, such that five (5) photoelectrons will be viewed by photomultiplier 70A and the balance of the photoelectrons will be viewed by photomultiplier 70B. Thus, if an event occurs in crystal 7', five (5) photoelectrons will be viewed by photomultiplier 70A and sixty-five (65) photoelectrons will be viewed by photomultiplier 70B. Similarly, if an event occurs in crystal 6' the slit height or barrier height in the tuned light pipe 68 is selected such that, on the average, fifteen (15) photoelectrons will occur or be viewed by photomultiplier 70A and fifty-five (55) photoelectrons will be viewed by photomultiplier 70B. Similarly, if an event occurs in crystal 5', thirty (30) photoelectrons will be viewed by photomultiplier 70A and forty (40) photoelectrons will be viewed by photomultiplier 70B. As shown in FIG. 6, distributions are picked, that is the light pipe is tuned, such that there is an equal overlap of the distributions.

Figure 7:
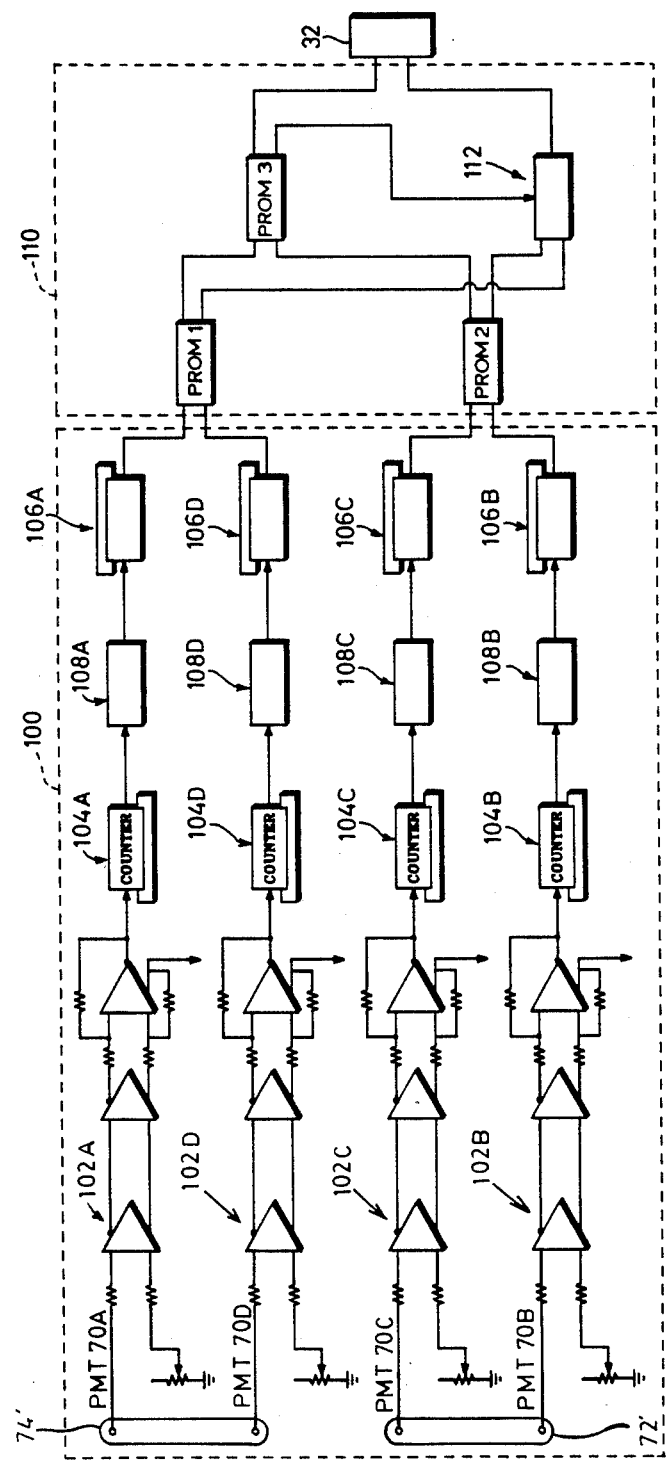
FIG. 7 illustrates the circuit diagram used in performing certain of the counting and pattern recognition processes of the system.

These examples refer to a constant number of photoelectrons being produced by a scintillation event. That is, there is an equal number of photoelectrons or an equal amount of energy produced, by a 511 Kev event with no Compton effects. The above example has been for a case where there is an equal number of photoelectrons. However, the number of photoelectrons resulting from an event will change. The ratios, however, such as 5:65 and the 15:55 and the 30:40 ratios will not change. These ratios are fixed by the geometry of the slits defined by the barriers 92 in the tuned light pipe 68. Thus, in gathering the positioning information, the range of distribution is inspected to locate a pattern, where, for example, sixty-five (65) photoelectrons are viewed by one photomultiplier and five (5) photoelectrons are viewed by another photomultiplier, or any combination which allows the above-mentioned ratios to be maintained. Because there is a limited number of ratios, and because the general area of interest is from 511 Kev to 250 Kev, in which case the pulse height will typically change from about seventy (70) to about thirty-five (35) as the total number of photoelectrons, all the possible combinations of the occurrences of photoelectrons at particular locations is a finite and relatively small set of numbers. Thus, all the possible combinations of counts that a particular scintillator can produce can be stored in a computer. For example, if an event occurs in scintillator 6', the ratios of counts in the four channels associated with each of the scintillators, to be described in greater detail hereinafter in connection with FIG. 7, there is a definite finite set of combinations of counts which uniquely define the location of the scintillation event as in scintillator 6'. Similarly, there is a definite number of photoelectron counts which will uniquely specify the location of a scintillation event in each of the thirty-two (32) crystals in the 4×8 crystal array.

FIG. 4B illustrates an enlarged view of the detector 20 shown in FIG. 4A. In this detector 20, the light guide or pipe 68, as described generally above, is slotted or tuned to control the statistical distribution of the photons entering the light pipe 68 from the optically associated crystals 64 through the juxtaposed and optically connected faces of the light guide and the crystal array. More specifically, the light pipe 68 can be fabricated from a BGO crystal, grown in a right circular cylindrical ingot configuration. In one embodiment, this ingot is 25-30 cm high. Each surface of the crystals and the light pipe are chemically etched. This can be accomplished by placing the crystals and the light pipe in hydrochloric acid for approximately 45 seconds. This etching process polishes each of the optical surfaces of the light pipe and the crystals such that photons are reflected or transmitted as they strike the crystals and/or surfaces of the light pipe, but such photons are not absorbed. This chemical etching step is an important feature for producing an optical quality surface.

The right circular and cylindrical ingot of a material such as BGO, in the preferred embodiment, is sawed by a multi-blade saw in which the blades are parallel and which cuts through face 78 of the light pipe 68. The depth of the cut or slots is determined by the positioning of the saw blades. For example, in the embodiment depicted in FIG. 4B, nine blades are used to cut the crystals in the direction of arrow 72 (see FIG. 5A) and five saw blades are used to cut the crystal to form the light pipe in the direction of the arrow 74 (see FIG. 5A). These blades are positioned parallel with respect to each other and have a preselected depth of cut which forms the square, or other desired configuration of the light pipe 68, and further serves to define the depth of the slots 90. After the light pipe 68 is cut thereby determining its cross-sectional outline and the depth of the slots, all surfaces of the crystals are chemically etched to form optically smooth surfaces. The chemical etching is normally performed with a hydrochloric acid (HCL) solution. The BGO crystals are normally submerged in the acid solution for about 45 seconds to accomplish the chemical etching. Other acids and submersion periods can be used as will be readily recognized by those skilled in the art. This chemical etching replaces a step of mechanically polishing the crystals which has heretofore been done. It will be recognized that the mechanical polishing is time consuming, and extremely difficult if possible at all in the areas of the cuts or slots.

Subsequent to the etching, suitable barriers are inserted into these cuts. In one embodiment, these barriers comprise barium sulfate reflective paint which serves as the reflective medium to form such barriers. It will, of course, be recognized by those skilled in the art that other reflective medium can be used for such barriers. While in the illustrated embodiment, a 4×8 array of slots are used in the light pipe 68, it will be recognized that the shape and sizing of this array can vary while maintaining a controlled distribution of the photons exiting the opposite face of such light pipe 68.

Figure 4D:
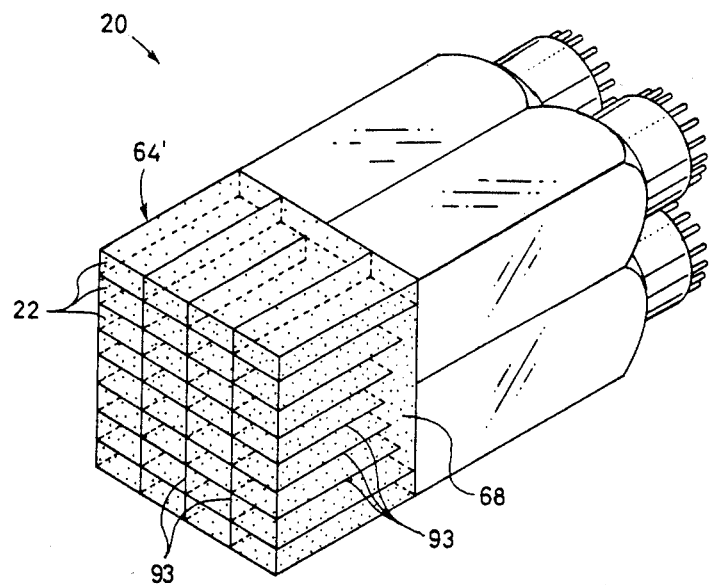
FIG. 4D is a perspective view of an alternate embodiment of a detector of the present invention.

Referring now to FIG. 4D, in one preferred embodiment the scintillator material members 22 and the light guide 68 are integrally formed. This integral construction obviates possible photon refraction which can otherwise occur at surface 78 where the scintillator material members are secured to the light guide 68. It will be appreciated that to accomplish this integral construction, a single crystal 64' can be used with the barriers 93 being produced by cutting slots and filing such slots with a suitable reflective medium such as barium sulfate reflective paint as discussed above with respect to the light guide 68. Accordingly, the barriers 93 serve not only to optically isolate the individual scintillator material members 22, but function as the tuning means 88 of the light guide 68. It will be appreciated by those skilled in the art that in addition to eliminating possible photon refraction, this integral construction simplifies manufacture of the detectors 20, thereby lowering cost of production.

An important feature of the present invention is to provide a two dimensional photon counting position encoding system and process which has improved spatial resolution characteristics over the known prior art. A detector of conventional design is illustrated at 130 in FIG. 4C. In this detector, a single crystal 132 and 132' is operatively associated with a single photomultiplier 134 and 134', respectively. These crystals 132 and 132' are mounted proximate the perimeter 136 and 136' of the respective photomultiplers. In this connection, the thickness of the face 138 of the combined crystals 132 and 132' in the direction of the arrow 140 controls the geometric spacing of additional detector combinations as illustrated in FIG. 4C. The thickness of this face 138 in the direction of the arrow 40 is thus controlled by the diameter of the prior art photomultipliers 134 and 134' Thus, as is well known by those skilled in the art, the photomultiplier size controls the spatial resolution of prior art systems inasmuch as the spacing of the crystals is a function of the photomultiplier dimensions. Counterwise, as illustrated in FIG. 4B, a plurality of crystals operatively associated with each photomultiplier, and the slotted or tuned light pipe 68 can be used to control the distribution of photons exiting the crystals while maintaining the ability to determine the position resolution of the crystals.

In constructing the detector 20 as shown in FIGS. 4A and 4B, face 78 of the light pipe 68 is optically connected to the juxtaposed face defined by the array of crystals 64 by a conventional optical epoxy. Similarly, the opposite face 84 of the light pipe 68 is optically connected with the juxtaposed face defined by the photomultiplier by a suitable and conventional optical epoxy. It will be noted that each slot in the light guide 68 is optically connected with one crystal and these crystals are optically isolated from each other in the preferred embodiment by coating each surface except the surface which is joined with the light pipe, with a suitable reflective paint or the like.

Means generally indicated at 100 is provided for counting the photoelectrons resulting from photons interacting with given scintillators or crystals 1' through 32'. More specifically, means 100 illustrated in FIG. 7 comprises an electronic processing system which counts photoelectron events, and in this connection the input leads 74' are connected to the outputs of the photomultipliers 70A and 70B which supply the transaxial positioning information. The input leads 72' are connected to the outputs of photomultipliers 70C and 70D which supply the axial positioning information. As shown, the counting means 100 includes four channels, one for each operatively associated photomultiplier. Each channel includes a fast amplifier discriminator 102A through 102D, respectively, which is used to discriminate between noise from the photomultipliers and single photoelectrons resulting from a scintillation event in the scintillators. The single photoelectron events in each channel are counted by a one stage, fast counter 104A through 104D, respectively, such as a MECL 10,000 Counter, plus a slower counter 106A through 106D such as a TTL 74F269, which are connected through the MECL to TTL interface units 108A through 108D, respectively. Each channel will count at a maximum rate of 200 MHz in the preferred embodiment. The four main counters will count up to 5 bits of information.

After the photoelectrons are counted as viewed by each photomultiplier, the distribution of photoelectrons is processed to determine the location of a scintillation event. To this end, pattern recognition means 110 is provided. More specifically, the contents of each counter is routed to one of the PROGRAMMABLE READ-ONLY MEMORIES (PROMS). PROM 1 has two outputs. One output is a six-bit word and will be the sum of the photomultipliers 70A and 70D. The second output is a two-bit word defining the channel with the maximum number of counts. PROM 2 sums photomultipliers 70B and 70C and determines the channel with the maximum number of counts. PROM 3 receives the sum words from PROM 1 and PROM 2 and outputs two words. One three-bit word defines which one of the eight transaxial positions generated the light, that is which one of the eight transaxial crystals. The other one-bit word defines which sum is the largest. The output of a simple logic network illustrated at 112 will determine which crystal in the axial direction produces the light. The PROMS are programmed to recognize and deal with any pattern of counts that are encountered.

A fast coincident timing channel is also included that derives its signal from the sum of the outputs from each photomultiplier. A standard timing channel will be utilized and is not shown for the sake of clarity. Also, a circuit will be included to limit the energy range of incoming gamma rays that will be accepted.

By counting the photoelectron events and determining the location of the crystal in which a particular pattern or number of events occur, the positioning information necessary to produce a tomographic image in a conventional manner is generated and fed to the diagrammatically illustrated computer 32 which will produce a tomographic image and display it on a monitor such as the monitor 38 (see FIG. 1).

TABLE A illustrates the number of counts in the photomultipliers (PMT) 70A-70D corresponding with the location of the crystal (scintillator) in which the counts occurs.

TABLE A

| SCINTILLATOR | PMT 70A | PMT 70B | PMT 70C | PMT 70D |
|---|---|---|---|---|
| 1' | 70 | 0 | 0 | 0 |
| 2' | 65 | 5 | 0 | 0 |
| 3' | 55 | 15 | 0 | 0 |
| 4' | 40 | 30 | 0 | 0 |
| 5' | 30 | 40 | 0 | 0 |
| 6' | 15 | 55 | 0 | 0 |
| 7' | 5 | 65 | 0 | 0 |
| 8' | 0 | 70 | 0 | 0 |
| 9' | 52 | 0 | 18 | 0 |
| 10' | 47 | 4 | 17 | 1 |
| 11' | 44 | 11 | 14 | 4 |
| 12' | 29 | 22 | 10 | 7 |
| 13' | 22 | 29 | 7 | 10 |
| 14' | 11 | 44 | 4 | 14 |
| 15' | 4 | 47 | 1 | 17 |
| 16' | 0 | 52 | 0 | 18 |
| 17' | 18 | 0 | 52 | 0 |
| 18' | 17 | 1 | 47 | 4 |
| 19' | 14 | 4 | 44 | 11 |
| 20' | 10 | 7 | 29 | 22 |
| 21' | 7 | 10 | 22 | 29 |
| 22' | 4 | 14 | 11 | 44 |

TABLE A-continued

| SCINTILLATOR | PMT 70A | PMT 70B | PMT 70C | PMT 70D |
|---|---|---|---|---|
| 23' | 1 | 17 | 4 | 47 |
| 24' | 0 | 18 | 0 | 52 |
| 25' | 0 | 0 | 70 | 0 |
| 26' | 0 | 0 | 65 | 5 |
| 27' | 0 | 0 | 55 | 15 |
| 28' | 0 | 0 | 40 | 30 |
| 29' | 0 | 0 | 30 | 40 |
| 30' | 0 | 0 | 15 | 55 |
| 31' | 0 | 0 | 5 | 65 |
| 32' | 0 | 0 | 0 | 70 |

It will be recognized by those skilled in the art, that the counted patterns recognized by the pattern recognition circuit means 110 includes PROMS for the count combination to determine the positioning information. Such PROMS are included for illustrative purposes only, and a variety of other devices can be used to implement the photoelectron count combination, for example, or the substitution of a computer would serve the same purpose if programmed for pattern recognition applications. However, the pattern recognition implemented by the circuit 110 provides substantial cost savings in the implementation of the illustrated embodiment. In the present implementation, the signature of each crystal location is stored in the PROMS, and each time this signature is fed into the circuit 110, the signature is compared with the stored signature and the output of the circuit 110 indicates the positioning information or the location of the crystal for which the simulation event occurs. Thus, the comparison identifies the specific crystal position and this information is outputed for production of the tomographic image. The original signatures programmed into the PROMS are determined by a calculation initially and normally refined by imperical data by injecting events at a specific location and determining the combinations which produce the specific crystal location information.

Figure 8:
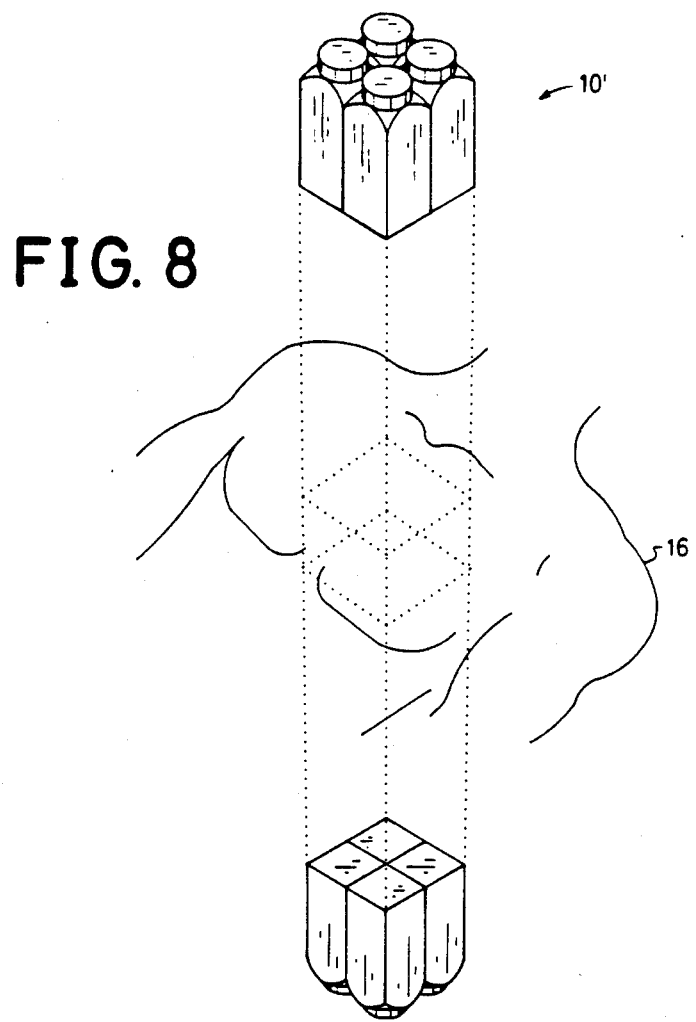
FIG. 8 illustrates an alternate embodiment of an application employing a two dimensional photon counting position encoder incorporating certain features of the present invention.

FIG. 8 illustrates an alternate embodiment of a two dimensional photon position encoder system 10' utilized in an application for producing a tomographic image of an organ within the body. In this illustration, detectors are mounted in juxtaposed position to detect gamma events produced by the metabolizing of radioactive isotopes. Thus, FIG. 8 illustrates an embodiment in which the position encoder system is positioned in an arrangement other than in a ring as is commonly used with the PET scanning system.

Figure 9:
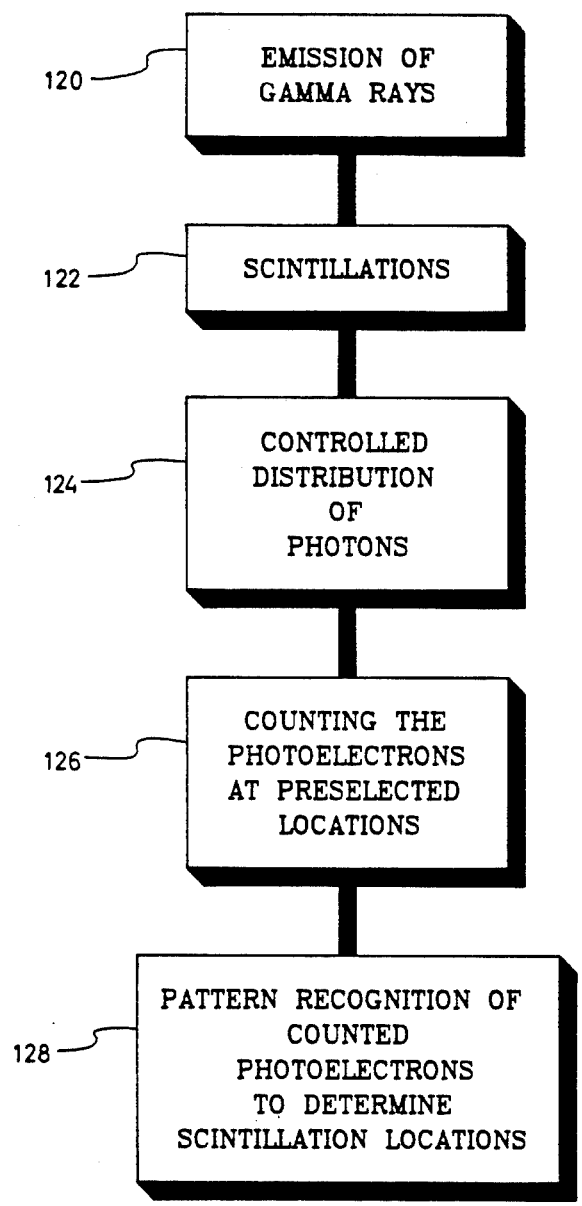
FIG. 9 illustrates a block diagram of a process incorporating features of the present invention.

The general process of the present invention, as described above in greater detail in connection with each of the components of the two dimensional photon positioning encoder, is illustrated in FIG. 9. In this figure, it can be seen at location 120 that gamma rays are emitted as a result of metabolizing a radioactive isotope. These gmma rays interact as indicated at location 122 in the scintillators or crystals, and produce photons. The distribution of the photons exiting the scintillators is controlled by a tunning means in the preferred embodiment, which comprises a tuned light pipe as is shown at location 124. Photoelectrons are generated at the PMT cathode and are counted at preselected locations along the light pipe corresponding with predetermined slots. The number of photoelectrons counted at these selected locations is compared to determine the scintillators within which the photoelectrons are generated, thereby gaining information concerning the location of the photon generation event. This pattern recognition technique is shown generally at 128.

From the foregoing detailed description, it will be recognized that a two dimensional photon position encoder system has been described and illustrated which incorporates certain improvements over the known prior art. More specifically, the illustrated photon position encoder is less expensive to manufacture and maintain. In this connection, a plurality of crystals are operatively and optically associated with one photomultiplier or other suitable scintillator detector. A plurality of scintillators are arranged in a predetermined matrix form. These scintillators are operatively associated with a plurality, but lesser number, of photomultipliers. Photoelectrons are counted, and the positioning information is determined, in the preferred embodiment, by a pattern recognition technique.

Thus, although the present invention has been described with a specific method and apparatus for providing an improved two dimensional photon positioning encoder, it is not intended that such specific references be considered as limitations upon the scope of the invention, except insofar as set forth in the following claims.

We claim:

1. A two-dimensional gamma ray photon position encoder system which enhances the spatial resolution of the situs of the orign of said gamma ray photons incident thereon, which comprises:
    a scintilltion detector having a first face for receiving said gamma ray photons, and a further face, said scintillation detector provided with a plurality of slots extending selected differing depths from said first face toward said further face to define a plurality of scintillation detector members in a two-dimensional array, said gamma ray photons producing scintillation photos in said scintillation detector members, said selected depths chosen to selectively control the distribution of said scintillation photons along axial and transaxial dimensions of said slotted detector; and
    means for receiving and counting at said further face of said detector said scintillation photons travelling at preselected locations along the length of said detector members, whereby the distribution of said gamma ray photons can be determined.

2. The encoder system of claim 1 further comprising optical barriers positioned in each of said plurality of slots in said scintillation detector.

3. A two-dimensional gamma ray photon position encoding process for enhancing the spatial resolution of the situs of the origin of gamma ray photons incident on a scintillation detector said scintillation detector having a first face for receiving said gamma ray photons, and a further face, said process comprising the steps of:
    providing a plurality of slots in said detector extending selected differing depths from said first face toward said second face to define a two-dimensional array of scintillator material members at selected locations to receive said incident gamma ray photons, said scintillation material members being arranged in said array and outputting a quantifiable number of scintiallation photons in response to the interaction of said incident gamma ray photons on said scintillator material members;
    controlling the statistical distribution of said scintillation photons travelling along the length of said scintillation material members array with said slots of selected depths; and
    detecting and measuring the distribution of said scintillation photons at preselected locations on said further face of said detector whereby said scintillation photons produced by said gamma ray photons entering said scintillation material members are distributed in a controlled statistical pattern at said further face and thereby said enhanced spatial resolution of the situs of the origin of said gamma ray photons is achieved.

4. The process of claim 3 including the step of rcognizing the pattern of the counted photons and the distribution thereof to determine the position location of the origin of said photons.

5. The tomography process of claim 3 further comprising providing optical barriers in said plurality of slots in said scintillation detector.

6. The encoder process of claim 5 wherein said providing of optical barriers in said slots comprises:
    chemically etching said scintillation detector having said slots to form optically smooth surfaces; and
    coating surfaces of said slots with a reflective medium.

7. A positron emission tomography process for sensing and quantitatively measuring biochemical and/or physiological changes in a iving organism in which a radioactive compound, including radioactive isotapes are administered to such living organism such that positrons are emitted from the isotopes as the isotopes are metabolized in the organism, each emitted positron encountering an electron such that both are annihilated causing the emission of gamma rays taking the form of two gamma ray photons, which are emitted from the situs of the annihilation in opposite directions (180 degrees apart), said process comprising:
    positioning a plurality of scintillator material members in an array, said array formed by providing in a scintillator detector slots of selected differing depths from a first face of said detector toward a further face, such that said gamma ray photons are incident thereon and produce a quantifiable number of scintillation photons which exit said scintillator material array; and
    controlling the statistical distribution of said scintillation photons exiting said scintillator material members by said slots of selected depths.

8. The process of claim 7 including the steps of counting the scintillation photons exiting said scintillation members to produce information to determine position information regarding the scintilliation event resulting from the gamma rays photons being incident on selected scintillation material members.

9. A two-dimensional photon position encoder system, including a scintillation detector which enhances the spatial resolution of the situs of the origin of gamma ray photons incident thereon, said position encoder system comprising:
    a scintilator material crystal, having a first face and a further face, defining a plurality of scintillator material members which interact with said incident gamma ray photons to produce a quantifiable number of scintillation photons, said scintillator material members being separated by a plurality of optical barriers of preseleted differing depths so as to integrally define with said scintillation detctor a tuned light guide for controlling the distribution of said scintillation photons moving in said scintillator material members along the axial and transaxial dimensions of said scintillator material members; and means operatively associated with said integral detector and light guide at said further face for detecting the distribution of said scintillation photons at preselected locations on said further face whereby said gamma ray photons produce said scintillation photons which are distributed by said scintillator material members and said optical barriers in a controlled statistical pattern and are detected by said means for determining said distribution of said gamma ray photons.

10. The encoder system of claim 9 wherein said scintillator material members are formed by providing slots in said crystal of a selected depth from said first face toward said further face, and said optical barriers are formed by applying optically reflective paint to surfaces of said slots.

* * * * *